United States Patent
Rabasa et al.

(10) Patent No.: US 11,150,924 B2
(45) Date of Patent: *Oct. 19, 2021

(54) SYSTEM AND METHOD FOR PLATFORM-INTEGRATED CUSTOM APPLICATIONS

(71) Applicant: Twilio Inc., San Francisco, CA (US)

(72) Inventors: Carter Rabasa, Seattle, WA (US); Martin Amps, San Francisco, CA (US)

(73) Assignee: Twilio Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/845,074

(22) Filed: Apr. 10, 2020

(65) Prior Publication Data

US 2020/0241897 A1 Jul. 30, 2020

Related U.S. Application Data

(63) Continuation of application No. 15/988,822, filed on May 24, 2018, now Pat. No. 10,705,864.

(60) Provisional application No. 62/510,407, filed on May 24, 2017.

(51) Int. Cl.
| | |
|---|---|
| *G06F 9/451* | (2018.01) |
| *G06F 9/445* | (2018.01) |
| *H04M 3/51* | (2006.01) |
| *H04M 3/42* | (2006.01) |
| *H04M 7/00* | (2006.01) |

(52) U.S. Cl.
CPC .......... *G06F 9/453* (2018.02); *G06F 9/44505* (2013.01); *G06F 9/44526* (2013.01); *G06F 9/451* (2018.02); *H04M 3/4217* (2013.01); *H04M 3/5191* (2013.01); *H04M 7/0021* (2013.01)

(58) Field of Classification Search
None
See application file for complete search history.

(56) References Cited

U.S. PATENT DOCUMENTS

| | | |
|---|---|---|
| 10,705,864 B2 | 7/2020 | Rabasa et al. |
| 2010/0142516 A1 | 6/2010 | Lawson et al. |
| 2017/0177338 A1 | 6/2017 | Gschwind et al. |
| 2018/0341502 A1 | 11/2018 | Rabasa et al. |

OTHER PUBLICATIONS

"U.S. Appl. No. 15/988,822, Notice of Allowance dated Mar. 11, 2020", 8 pgs.
U.S. Appl. No. 15/988,822, filed May 24, 2018, System and Method for Platform-Integrated Custom Applications.

*Primary Examiner* — Quynh H Nguyen
(74) *Attorney, Agent, or Firm* — Schwegman Lundberg & Woessner, P.A.

(57) ABSTRACT

A system and method for customizing communication processing within a communication platform that includes configuring a service handler, which comprises of at least setting execution code of the service handler; setting an association between the service handler and a communication event of the communication platform; detecting the occurrence of the communication event of a communication facilitated through the communication platform; invoking the service handler in response to the event, which comprises: executing the execution code in a serverless execution environment and generating a service handler response; and augmenting the communication in accordance with the service handler response.

20 Claims, 11 Drawing Sheets

```
const T = require('CommPlatformT')

module.exports = function(context, event, callback) {
  let ml = new T.mlResponse()
  switch (event.Digits) {
    case '1':
      ml.say('Store hours are 9 to 5 P M')
      break
    case '2':
      ml.dial('+12025551212')
      break
    case '3':
      ml.say('Leave a message')
      ml.record()
      break
    default:
      ml.gather({numDigits: 1}, function() {
        this.say('Welcome to the IVR. Press 1 2 or 3')
      })
  }
  callback(null, ml)
})
```

FIGURE 10

```
module.exports = function(context, event, callback) {
    // define bad word blanking function
    function blanks(str) { return str.replace(/./g, '*') }
    // define list of bad words
    const bad_words = [<list of bad words>]

let cleanBody
    bad_words.forEach(function(bad) {
       cleanBody = cleanBody.replace(bad, blanks)
    })
    // return sanitized Body
    callback(null, {Body: cleanBody})
})
```

FIGURE 11

```
const T = require('CommPlatformT')

module.exports = function(event, context, callback) {
  var capability = new T.Capability(
    context.secrets.ACCOUNT_SID,
context.secrets.AUTH_TOKEN);
  capability.allowClientIncoming('jenny');
  callback(null, {token: capability.generate()})
})
```

FIGURE 12

SYSTEM AND METHOD FOR PLATFORM-INTEGRATED CUSTOM APPLICATIONS

CROSS-REFERENCE TO RELATED APPLICATIONS

This application is a continuation of U.S. patent application Ser. No. 15/988,822, filed on 24 May 2018, which claims the benefit of U.S. Provisional Application No. 62/510,407, filed on 24 May 2017, both of which are incorporated in their entireties by this reference.

TECHNICAL FIELD

This invention relates generally to the computing platform field, and more specifically to a new and useful system and method for platform-integrated custom applications in the computing platform field.

BACKGROUND

There are a number of scenarios when a developer will deploy a small web application to facilitate some functionality. In some cases, an external computing platform may be used to facilitate particular functionality, such as in managing telecommunications. A web application managed by the developer may be required to provide certain types of functionality enabled through the computing platform. Deploying a web application, however, means the developer becomes responsible for operation, reliability, security, and scalability of the infrastructure to support the web application. Burdens such as this can negatively impact the developer's productivity. Thus, there is a need in the communication field to create a new and useful system and method for platform integrated applications. This invention provides such a new and useful system and method.

BRIEF DESCRIPTION OF THE FIGURES

FIGS. 10-12 are exemplary service handlers for handling various use cases.

DESCRIPTION OF THE PREFERRED EMBODIMENTS

Figure 1A:
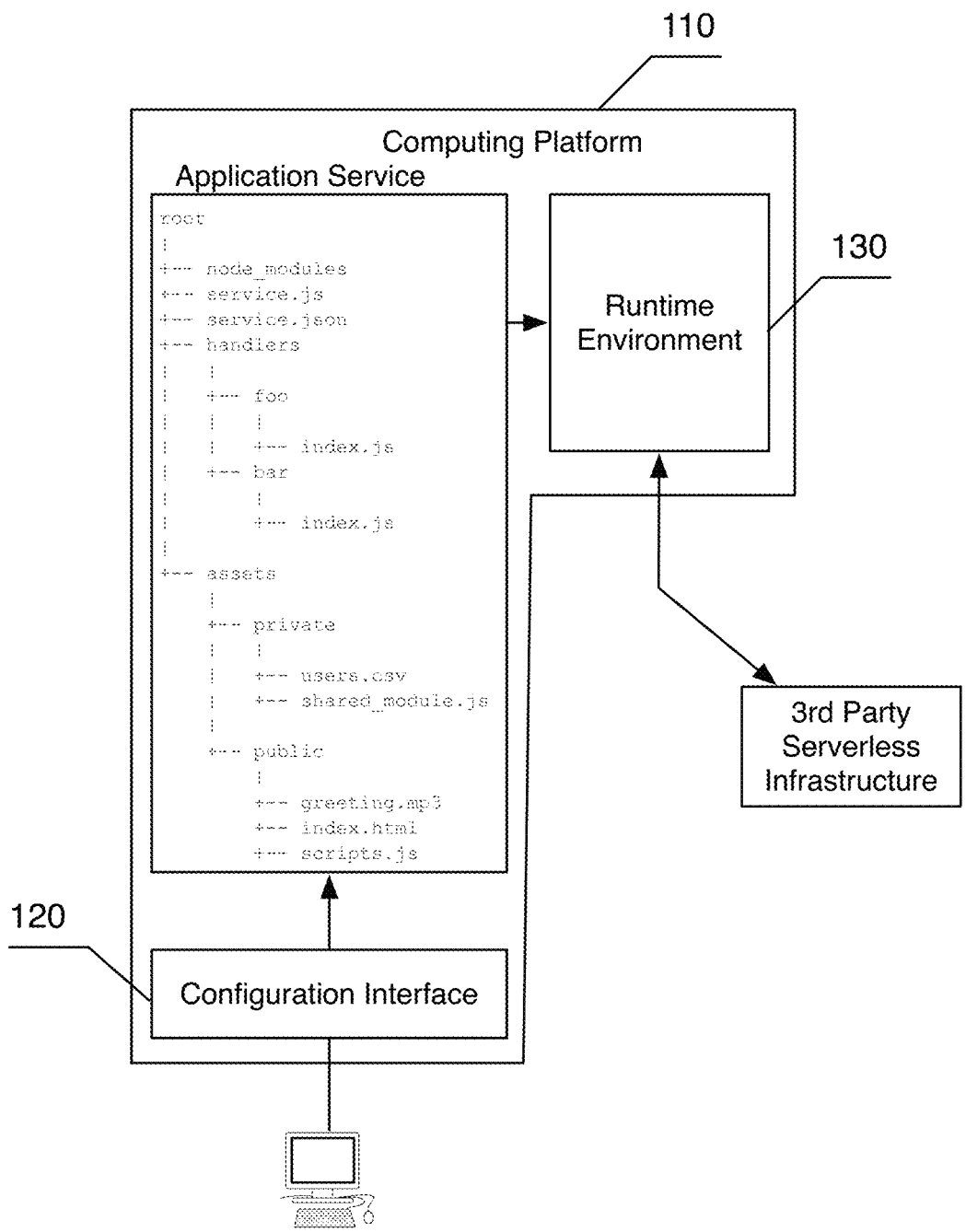
FIGS. 1A and 1B are schematic representations of a system of a preferred embodiment.

The following description of preferred embodiments of the invention is not intended to limit the invention to these preferred embodiments, but rather to enable any person skilled in the art to make and use this invention.
1. Overview A system and method for platform integrated applications of a preferred embodiment can function to enable development of applications used in defining processing logic used in cooperation with functionality of a computing platform. The applications developed and executed through the system and method can be described as web application services that may have one or more service handlers, which are functions that can respond to particular requests. The system and method are preferably employed in combination with a computing platform. Relevant computing platforms will preferably include developer facing functionality and more preferably will have at least one programmatic interface that uses event handling to execute account specified logic. Through the system and method, developers can develop, deploy, and integrate applications directly within the computing platform as a serverless solution.

The system and method are preferably applied to communication platforms. A communication platform is preferably an internet accessible service that facilitates communication. The communication platform could be a telephony platform that facilitates PSTN or VoIP phone calls; a video session platform; a messaging platform that facilitates SMS, MMS, proprietary messaging, and the like; a screensharing platform; and/or any suitable communication related platform. The communication platform may additionally facilitate multiple types of communication. The system and method for platform-integrated custom applications may have particular applicability to communication or media-heavy applications where latency minimization is a priority.

In particular the communication platform is preferably at least partially programmatic wherein developers or other entities can customize some portion of functionality. In one preferred variation, a programmatic communication platform enables particular actions or functionality to be customized through the use of callback URIs. The system and method may integrate with such functionality to enhance ability to create and develop such functionality.

The communication platform is preferably multitenant, which involves shared use of the platform from multiple and distinct entities. These entities can be managed within the platform as accounts, sub-accounts, endpoints (e.g., phone numbers, short codes, SIP addresses, or other communication addresses), and/or other entity constructs. The system and method preferably allows for individualized communications and individualized custom applications on a per entity basis. For example, a first account can create one custom application that is different from a custom application of a second account.

In one variation, the communication platform is preferably a programmatic communication platform wherein the communication platform is used in defining communication logic during a synchronous communication session (e.g., audio or video call) or in an asynchronous communication, such as in the communication platform described in U.S. Pat. No. 8,306,021, issued 6 Nov. 2012, which is hereby incorporated in its entirety by this reference. The system and method may alternatively be used in combination with a communication service such as a platform that offers a customer facing communication application or any suitable communication based platform. As one example, the communication platform may be a call center focused platform that provides a call center customization framework. The system and method may be used in combination with the call center communication platform to enable easier customization of call center functionality.

While, the system and method are described herein as implementing various communication related features, the system and method may alternatively be used in other suitable types of platforms such as a commerce platform, a payment platform, data analytics/hosting platform, an IoT platform or any suitable platform with programmatic interfaces. In many cases the computing platform is positioned as a platform as a service (PaaS) platform, a software as a service (SaaS) platform, infrastructure as a service (IaaS) platform, or other suitable types of platforms.

As one potential benefit, the system and method can enable faster development of applications that can be integrated with the computing platform. As a first element of faster development time, developers can be alleviated from going through a lengthy process of setting up a full HTTP web stack deployment on their own managed infrastructure. Furthermore, the many aspects of creating a custom web application can be provided by default when creating a custom service handler application from within the application. For example, security and access control can be configuration options that don't depend on any development. Such accommodations will generally lead to a faster path to first deployment.

In the example of a communications platform, one potential use case is defining call logic for handling inbound calls or messaging logic for inbound messages of a phone number managed within the communications platform. Custom logic could be created as simply as selecting a phone number or other suitable type of endpoint; selecting an option to create service handler from a template (e.g., a phone tree template, a call routing template, voice mail template, etc.); edit or customize the template; and save the updated service handler. In this implementation. A highly customizable call or message logic can be created without having the developer stand up a full application.

As another element of faster development time, the system and method can include convenience features that simplify integration and building of applications specific to the computing platform. For example, development libraries or other programmatic conveniences of the communication platform can be included by default in a service handler configuration interface.

As a related potential benefit, the system and method can make programmatic customization of the computing platform accessible to a wider audience. Not all developers are experienced in setting up, maintaining, and securing web applications. Providing platform integrated applications can remove some of the barriers-to-entry for many users and enable those with basic programming experience to develop rich customized integrations with the computing platform. In some cases, application templates could additionally be offered which would further extend the audience such that users with little programming experience could customize various aspects of a template service handler.

As another potential benefit, the system and method can enable more secure application integration with the computing platform. The system and method can provide standard security best practices automatically. As one example, the computing platform could automatically restrict access of the web application service to the computing platform. Furthermore, the system and method can enable more control over the implementation of programmatic customization of a computing platform. For example, some customers of a computing platform may want or need to avoid exposing data to the public internet. A service handler of the system and method could be used to perform customized logic within the infrastructure of the computing platform and then directly interface with the computing infrastructure of the customer.

As a related potential benefit, the custom application implemented within the platform can be implemented in a manner that may result in higher reliability. In one related variation, use of the custom application can be coordinated with internal platform operations. For example, a custom application to process an incoming communication can be primed and even processed on-demand in preparation of a possible event that would trigger a potential invocation of the custom application.

As a related potential benefit, the system and method could provide lower latency performance by hosting the web application service in a local or more readily accessible location/computing infrastructure. This could be particularly important for computing platforms that facilitate synchronous communications such as phone calls, video chat sessions, and/or other forms of media streaming. More specifically, such potential performance enhancements may be applied to customized media processing and handling. Many media processing intensive tasks may not be feasible using traditional platforms where processing is delegated and executed by a third party outside of the main platform.

As another potential benefit, logging, error handling, and/or anomaly detection of the platform could be more deeply integrated into the logic of the developer's application. In some existing architectures, developer application logic and infrastructure is a black box. In the system and method, underlying service handler logic could be used in detecting different problems.

As another potential benefit, the system and method could additionally be used in creating a library of custom functionality that can be easily integrated into other programmatic logic. In some preferred variations, the communication platform could provide a visual work flow user interface to create a customized workflow. Various service handlers may be used as functions or operators within a custom work flow. In another variation, the communication platform could provide other custom application/service frameworks. The frameworks could be a visual user interface, but could alternatively be a programmatic interface such as a component-based user interface framework. Such a custom application framework could be used in customizing a call center application. Within the call center application, one or more customer service handlers could be configured to perform some function, which may make the framework highly customizable.

2. System

Figure 1B:
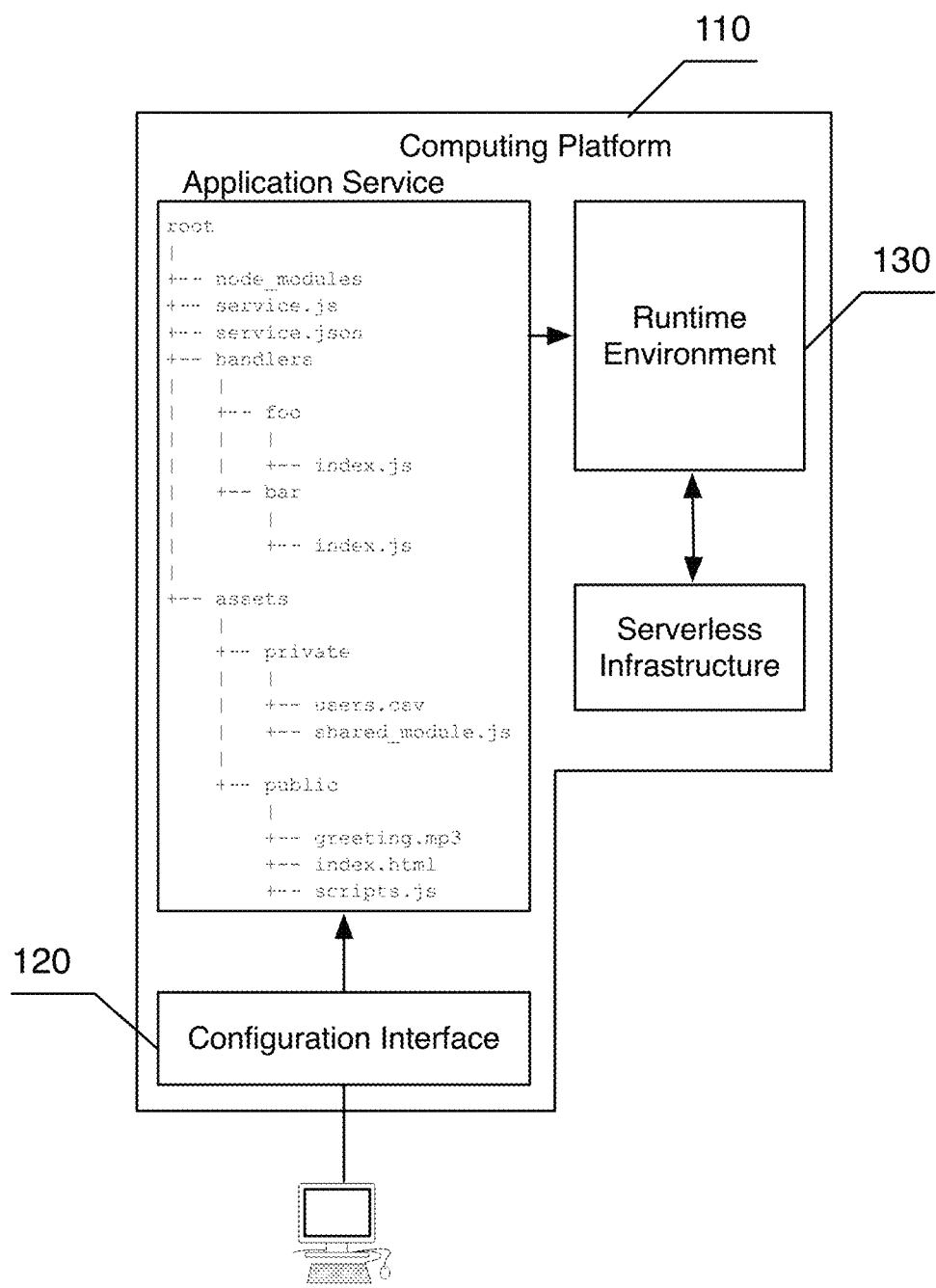

As shown in FIGS. 1A and 1B, a system for platform integrated applications of a preferred embodiment can include a computing platform 110, a service configuration system 120, and a runtime environment 130. The system functions to facilitate the creation of custom functionality within the computing platform 110. While the system can be applied to a variety of types of computing platforms 110, one preferred variation applies the system to a communication platform 111.

Figure 2:
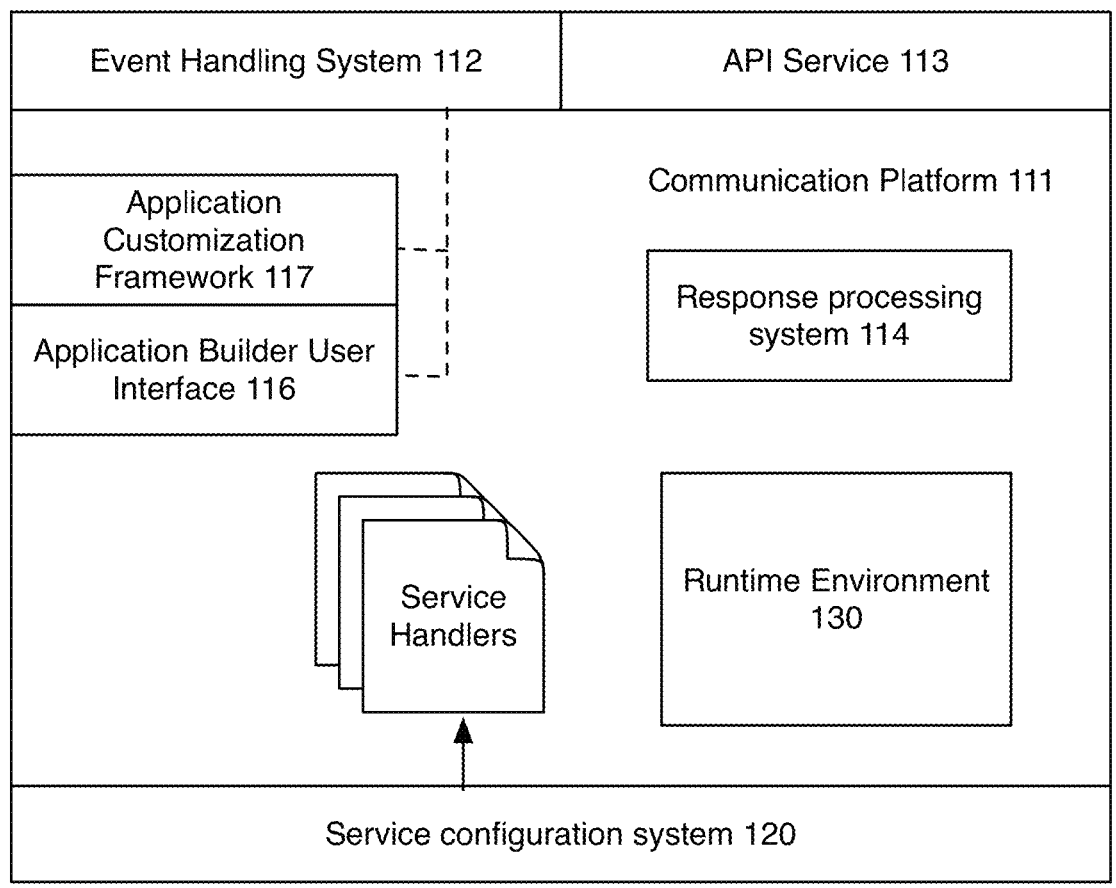
FIG. 2 is a schematic representation of a system applied to a communication platform.

In one particular variation as shown in FIG. 2, the system can include a communication platform 111, a service configuration system 120, and a runtime environment 130. The communication platform 111 is preferably configured with machine-readable instructions to facilitate a communication (synchronous or asynchronous) and to augment the communication based on execution and response of a service handler. The service configuration system 120 is preferably configured with machine-readable instructions to create a service handler. The runtime environment 130 is preferably configured with machine-readable instructions to execute the service handler and generate a service handler response.

The computing platform 110 functions to provide some computational service or functionality. The computing platform 110 is preferably a multitenant platform, wherein the computing platform 110 includes a set of accounts that can independently use the computing platform as described above. The computing platform 110 can enable multiple distinct accounts, sub-accounts, or other entities to utilize the platform independently. Generally, the account holders may be developers that can develop various applications, services, integrations, or other forms of functionality that leverages capabilities of the computing platform 110.

In many cases the computing platform 110 is positioned as a platform as a service (PaaS) platform, a software as a service (SaaS) platform, infrastructure as a service (IaaS) platform, or other suitable types of platforms. The computing platform 110 could be a commerce platform, a payment platform, data analytics/hosting platform, an IoT platform or any suitable type of computing platform with programmatic interfaces or channels to which a customized service handler may be applied. Herein, examples of the computing platform 110 will primarily be focused on a communication platform 111 but any suitable computing platform with customized features could alternatively be used. A communication platform 111 in particular can facilitate a set of communication capabilities such as PSTN calls, IP/SIP based voice or video calls, SMS or MMS messaging, IP messaging, third party communication channel integrations, notifications, internet data communications, and/or other communication operations.

The computing platform 110 will preferably expose various programmatic interfaces such as an event handling system 112, an API service 113, and/or in some cases a response processing system 114. Graphical user interfaces could additionally be offered through web applications, native applications, command line interfaces, and/or other suitable forms of interfaces. In one preferred variation, the computing platform may additionally provide an application builder user interface 116 and/or an application customization framework 117 through which service handlers may be used to expand functionality.

An event handling system 112 of the computing platform 110 functions to offer webhook or callback functionality in augmenting, altering, or otherwise interacting with another resource. In the event handling system 112, event callbacks can be activated in response to different state changes or events. A computing platform 110 that uses or exposes an event handling system 112 could enable custom service handlers to easily be integrated as a callback options. In this way, to customize functionality in the computing platform 110, a subset of the event callbacks could be service handlers, which could be set by an account holder. Another subset could be external event callback URIs that may not leverage a service handler. When an event callback condition is satisfied, a configured event is executed. The event could be an internal operation, a callback event, or any suitable event. In the cases where the event has an event callback set to a service handler, the event handling system 112 would be configured to detect the occurrence of an event associated with a service handler and initiate invocation of the service handler at a runtime environment (and thereby trigger execution of the service handler if permitted).

In the case of a communication platform, the event handling system 112 could be used to trigger event callbacks in response to various communication events like call began, call ended, conference call began, input received (e.g., DTMF input, voice command, etc.), recording began/ended, conference began/ended, conference member joined/left, message received, message sent, and/or any suitable type of event, error encountered, and/or any suitable type of event. The specified service handler or callback URI may use that event notification to perform some internal logic, but may additionally generate a response that is used by the communication platform 110. For example, a response from a service handler can include dynamically generated communication processing instructions (e.g., application logic to use to control a phone call or generate a response to a message).

An event handling system 112 preferably operates in a request-response model where some request is made with contextual data and then a response is generated and returned. In the communication platform 111, the contextual data may include metadata related to the event and/or communication. For example, metadata for an inbound call or message could be passed in the request to a service handler. The service handler will preferably receive execution requests from the event handling system 112, process the request according to the configured logic, and produce a response. In some cases, the event handling system 112 can then relay the response to the response processing system 114, but the response could alternatively be used within the computing platform in any suitable manner. The communication platform may interface with the service handlers and/or the external callback URIs using an application layer protocol such as HTTP/S, but any suitable interface may be used. A service handler may be identified through an assigned callback URI, which will preferably be a recognized path that can be at least partially routed internally within the computing architecture of the computing platform 110. A service handler may alternatively be identified through any suitable identifier.

In one variation of the communication platform 111, a media object may be relayed to the service handler such that custom processing of communication related media can occur. Use of a service handler may be preferred option as it can enable customized logic to be executed within the infrastructure of the communication platform 111. This may reduce latency, which can be an important property for a communication service. The media object could be relayed to the service handler by referencing a media stream in which case, the configured logic of the service handler may act synchronously on the referenced media stream. This may be used to transform the media in real-time. This may alternatively be used to enable real-time analysis of a media stream through custom processing logic of a service handler. Alternatively, the media object could be a copy of a media object like an image or video, and the service handler could operate on that media object and generate a response in any suitable manner. In one variation, a transformed media object may be returned in the response. In another variation, the media object could be analyzed and used in generating a response.

The API service 113 functions as a programmatic interface for managing and interacting with configuration and triggering actions in the computing platform. The API service 113 is preferably a RESTful API but may alternatively be any suitable API such as SOAP, GraphQL, or custom protocol. The RESTful API works according to an application layer request and response model. An application layer request and response model may use an HTTP-based protocol (HTTP or HTTPS), SPDY, or any suitable application layer protocol. Herein, HTTP may be used, but should not be interpreted as being limited to the HTTP protocol. HTTP requests (or any suitable request communication) to the communication platform preferably observe the principles of a RESTful design. RESTful is understood in this document to describe a Representational State Transfer architecture as is known in the art. The RESTful HTTP requests are preferably stateless, thus each message communicated contains all necessary information for processing the request and generating a response. The API service 113 can include various resources, which act as API endpoints that can act as a mechanism for specifying requested information or requesting particular actions. The resources can be expressed as URI's or resource paths. In one exemplary instance, a GET request (or other suitable method of an application layer protocol request) can be transmitted to a URI specifying a particular API resource. The response to the request can include properties of the specified resource. In another exemplary instance, a POST request (or other suitable method of an application layer request) can be transmitted to a URI specifying a particular resource. Properties of that request can initialize some action and/or change in data within the computing platform. Different resources can expose different channels to information and/or control of the computing platform. In one variation, the API service 113 can expose resources enabling an account to create, read, update, or delete platform integrated applications.

The API service 113 is an additional or alternative programmatic interface through which a service handler may be used to execute customized logic. In one preferred implementation, an API service 113 will similarly have a subset of requests that follow a protocol enabling the identification of a callback, which may be configured within an API request as a service handler identifier, and/or an external callback URI.

The response processing system 114 functions to execute some action from a response from a service handler. Responses from a platform integrated application can be processed and used in operation of the computing platform 110. In one variation, the response may be used in augmenting or altering the operation of the computing platform 110. For example, in a communication platform 111 the state of a communication session could be altered or directed in accordance with the response. In another variation, the response may be indirectly used with an operation of the computing platform 110.

In one implementation, the response from a platform integrated application can be an application logic specified through an executable document. The executable document can be a structured document such as an xml file or a json data representation. In one variation, a markup language document can be used in specifying a set of instructions and conditions that can be sequentially executed. In the communication platform variation, the response can include communication instructions for a sequence of actions to be executed during a communication such as playing a test-to-speech message, capturing DTMF input, recording audio, connecting to another endpoint, starting a conference, sending a message, ending a call, or performing any suitable action.

In another communication platform exemplary implementation, the response may specify a response media object. The response media object can be used within the communication. For example, a media object could be generated through a service handler and that media object could be sent in a message to a specified destination.

The application builder user interface 116 functions to serve as a graphical user interface for setting of various attributes of a service or application instance. Account holders may use an application builder user interface 116 to customize high-level functionality of the computing platform 110. Some computing platforms 110 may primarily operate based on account-directed configuration specified in an application builder user interface 116. In other computing platforms 110, an application builder user interface 116 may be just one optional platform configuration mechanism.

An application builder user interface 116 will generally come with a set of customization tools that provide default functionality. Various applications, services, or interactions can be built using the default functionality. Preferably the application builder user interface 116 additionally includes configuration options wherein a service handler may be associated with a defined communication event. The configuration option is preferably a user interface component that is selectable to specify a service handler (e.g., selecting a service handler as an option in a dropdown list, entering a service handler address/ID, etc.). The associated communication event is preferably dependent on what the user interface component is and/or the state of the application builder user interface 116.

Figure 3:
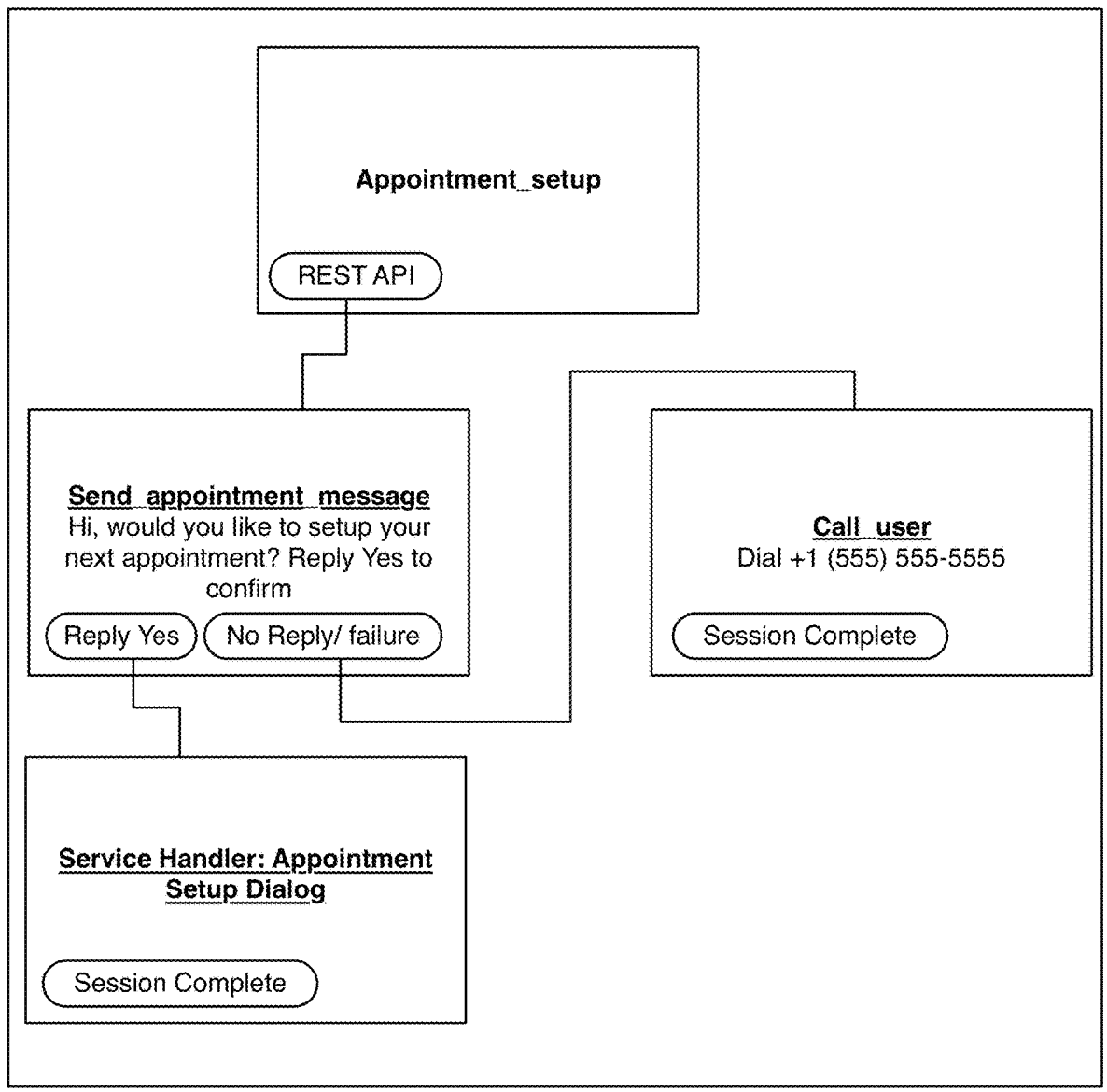
FIG. 3 is a schematic representation of an exemplary visual workflow editor variation of an application builder user interface.

An application builder user interface 116 may be designed to address any suitable use case. In one preferred variation, the application builder user interface 116 is a visual communication workflow editor that functions to allow the processing and flow of a communication to be defined within a user interface. As shown in FIG. 3, various aspects of a communication session and its associated logic could be defined with various components, the settings of the components, and the relationships between components. Service handlers could be used within the visual communication workflow editor to expand the type of functionality that can be used in defining a customized workflow.

As a related variation, an application customization framework 117 functions to more programmatically define an application or service. A graphical user interface may be used in the customization process. Alternatively, more code-based programmatic customization may be used in an application customization framework 117. The application customization framework may similarly include various event triggers or callback functionality wherein a service handler could be triggerable within the functionality of an instance of the application customization framework 117.

One exemplary application customization framework 117 could be a call center customization framework, which functions to enable custom call center user interfaces and functionality to be defined. An instance of a custom call center using the call center customization framework will generally be used in facilitating a set of agents in servicing call requests. A call center customization framework can preferably be configured with at least one component element that is configurable to associate a service handler with a defined communication event. Selection of service handlers could be used in customizing a call center agent user interface for changing interaction flows, automating actions and communications, and/or performing any suitable service.

The service configuration system 120 functions to enable a user to create a platform integrated application service. The service configuration system 120 is preferably used by an account holder in creating, updating, deleting, or otherwise interacting with various handler services. The service configuration system 120 is preferably used in setting and configuring one or more service handlers. In one preferred implementation, an account entity can organize service handlers within a service grouping. In this variation, a service configuration system 120 may provide a service-level interface for configuring general service level options and a service handler interface for configuring specific service handler functionality. Any suitable approach to service handler configuration may alternatively be used. The service configuration system 120 may additionally include a platform integration interface for integrating a service handler into some operation within the computing platform 110d. The application configuration interfaces can be graphical user interfaces or programmatic interfaces such as an API.

Figure 4:
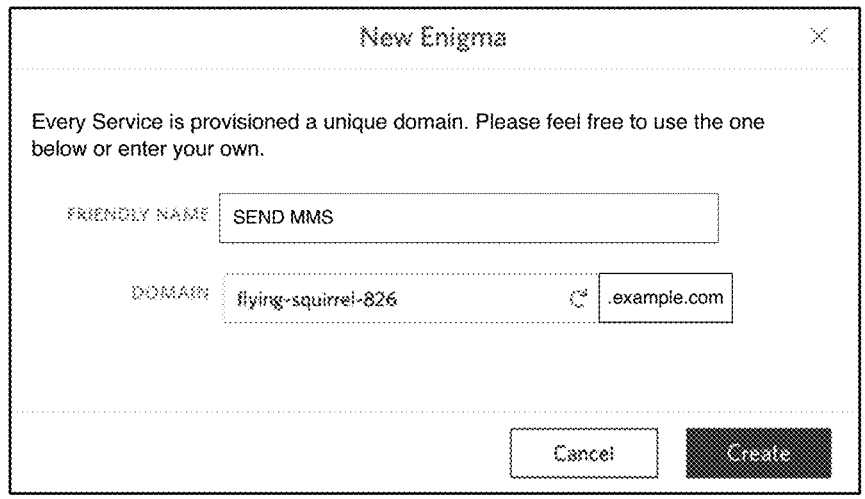
FIGS. 4-7 are exemplary screenshots of configuration interfaces of the system.
Figure 5:
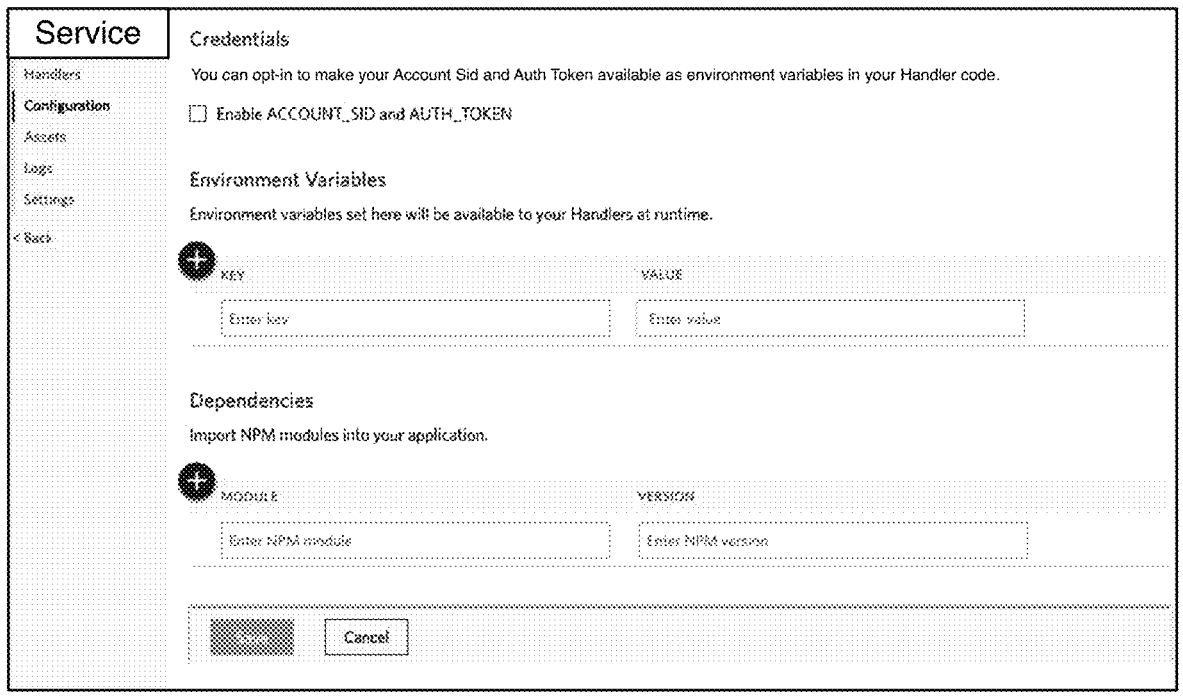

The service interface functions to enable services to be created, configured, and/or otherwise deployed. A service could have a various properties such as an identifier, a name, a domain name, a runtime type, and/or other properties as show in FIGS. 4 and 5. The domain name can be used to set the domain or subdomain URI used to access the handlers and/or assets of the service. A service interface may be used in managing or navigating service handlers and/or assets.

Figure 6:
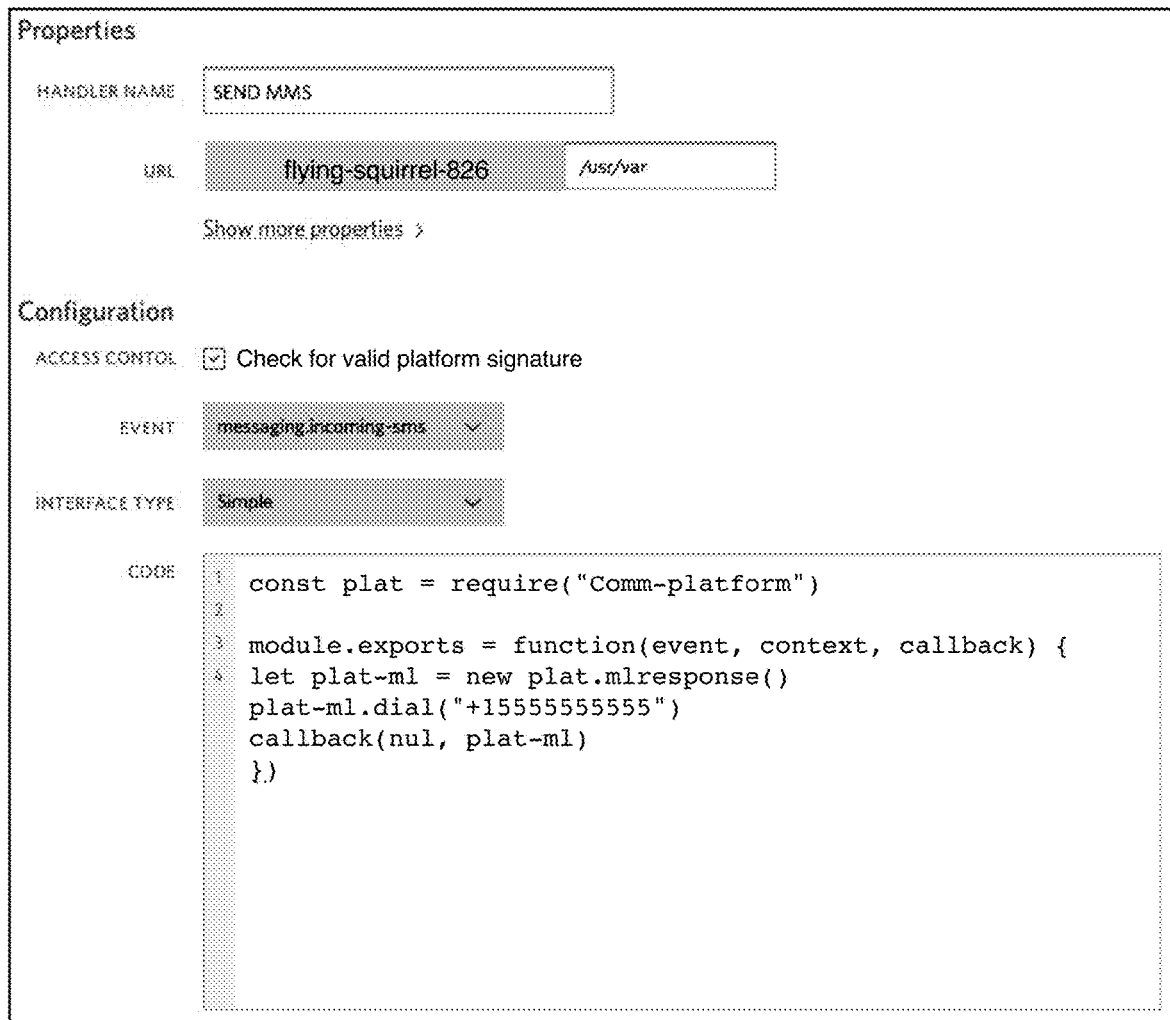

The service handler interface functions to enable configuration of a service handler as shown in FIG. 6. A service handler is preferably where a handler function and/or configuration associated with the service handler can be set. A handler function is preferably executable code or logic. In one implementation it can be a node.js code file or project. Any suitable programming language or framework may be used in specifying executable code of a service handler. The code could be entered in an editor or could be uploaded as a file.

A service handler could additionally include various configuration properties such as a handler name, a URI path, and/or an access control option. A URI path property can define the route for accessing the service handler. The access control option can be a configuration option that when enabled restricts access to the service handler to the computing platform. Access control properties could alternatively enable customized access restrictions.

In one variation, the service handler interface could additionally support handler templates, a handler browser, and/or a handler marketplace. A handler template could enable a user to use the template as a starting place, but then customize aspects for their particular use case. Executable code may be at least partially specified from template executable code if a template service handler is used in initiating a new service handler. The executable code may be editable or partially editable. In one implementation, templates can be directly integrated into documentation of the computing platform such that a user could directly create a service handler based on examples in the documentation.

The platform integration interface functions to facilitate integrating service handlers with various events. Preferably, different features of the computing platform have a required or optional callback property. The platform integration interface could support specification of a particular service handler. Alternatively, since the services and service handlers may have designated URI paths, the URI paths of a service handler could be used in any callback URI property. In one variation, the event-handler associations could be set within the service handler interface.

The runtime environment 130 functions to execute and run a platform integrated application. The runtime environment 130 preferably provides a web application stack used in bootstrapping the web application, routing HTTP requests, and implementing various application features such as authentication, request whitelisting or blacklisting, and the like. The runtime environment 130 preferably interfaces with or implements a serverless infrastructure system. A serverless infrastructure is preferably a computing solution that runs code in response to events. The serverless infrastructure can support various languages and frameworks such as node.js, JavaScript, Java, python, ruby, ruby on rails, go, and the like. In one variation the serverless infrastructure is one provided by a cloud computing provider. In this variation the runtime environment 130 is configured to interface with the external serverless compute resource or other suitable type of compute resource. In another variation, the serverless infrastructure is a self hosted system implemented within the computing platform. Alternative runtime environments may alternatively be used. In one variation, a server-based infrastructure could be used to instantiate dedicated resources (at least for particular windows of time) for a service and/or service handler. In another variation, the computing platform could implement a hybrid runtime environment wherein a portion of service handlers are executed through a serverless infrastructure and another portion of service handlers are executed through dedicated compute resources. A runtime orchestration service could manage which service handlers should be serviced by which type of computing resources. This may be used where some service handlers have high enough traffic to warrant dedicated longer term resource allocation.

Figure 7:

The web application stack provided as part of the runtime environment in one implementation can include a routing system, a configuration file, a handler directory, and an asset directory. The routing system functions to direct incoming HTTP requests to proper handlers and/or assets. The routing system can additionally handle error handling. The handler directory can host the service handler code used in defining different functions of the platform integrated application. The handlers will preferably be executed by the serverless infrastructure when triggered. The asset directory can host public and/or private files as shown in FIG. 7. Public assets are static files that can be uploaded and made publicly available. Some exemplary files for a website may include HTML, CSS, images, video, and JavaScript files. Examples of files for a telephony voice related service handler could be an mp3 file. An exemplary asset of an MMS related service handler could be a jpg file. Private files are not made available publicly but can be accessed by handlers. In one example, a json file of routing information can be stored as a private file and used in directing communications in a call handler function.

3. Method

Figure 8:
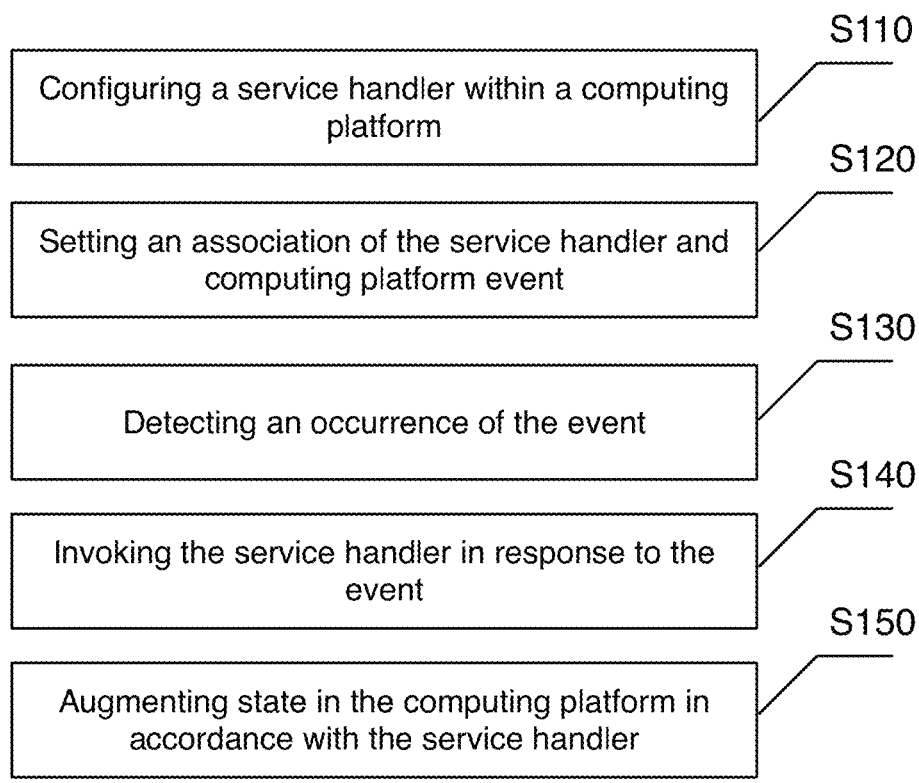
FIG. 8 is a flowchart representation of a method of a preferred embodiment.

As shown in FIG. 8, a method for platform integrated applications of a preferred embodiment can include configuring a service handler within a computing platform S110, setting an association of the service handler and computing platform event S120, detecting an occurrence of the event S130; and invoking the service handler in response to the event S140. Invoking the service handler S140 preferably includes at least executing execution code of a service handler S142 and generating a service handler response S144. The method may additionally include augmenting the account related state in the computing platform in accordance with the service handler S150. The method is preferably implemented through a system substantially similar to the one described above, but any suitable system can be used.

Figure 9:
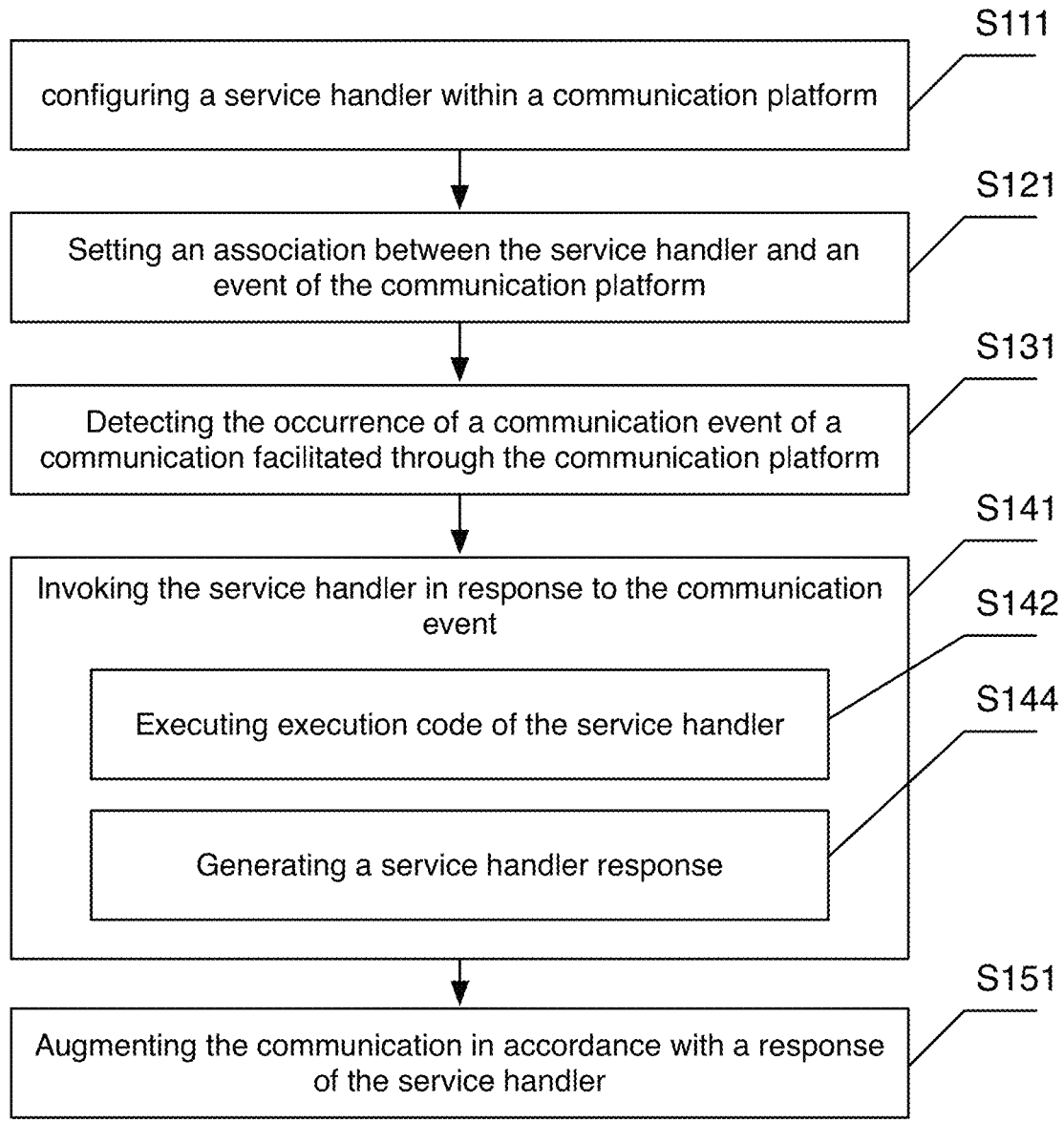
FIG. 9 is a flowchart representation of a method applied to a communication platform.

As shown in FIG. 9, one preferred variation of the method applied to a communication platform can include configuring a service handler within a communication platform S111, setting an association between the service handler and an event of the communication platform S121; detecting the occurrence of a communication event of a communication facilitated through the communication platform S131; invoking the service handler in response to the communication event S141; and augmenting the communication in accordance with a response of the service handler S151. This variation preferably integrates the use of service handlers in the customized handling and processing of communications. Similar variations of the method may also be applied to other types of computing platforms.

The communication platform variation of the method could be used for synchronous communications and/or asynchronous communications (e.g., text messages, media messages, multi-media messages, and the like).

A synchronous communication could include a synchronous voice session (e.g., PSTN phone call, VoIP call, SIP call, a conference call, WebRTC-based call, and the like), video session, screensharing session, virtual reality or gaming session, data-streaming session, and/or any suitable type of synchronous communication. A synchronous communication can preferably have service handlers triggered and applied to the state of the communication session. In one preferred variation, a response from the service handler includes synchronous-communication instructions and augmenting processing of the communication includes executing the synchronous communication instructions. In one example, a service handler could return a sequence of telephony instructions that may direct a current call to perform actions like read text to a caller, play an audio file for the caller, add another party to the call, record the caller's voice, collect digits the caller types on their keypad, hang up the call, add the caller to a queue of callers, remove a caller from a queue of callers, redirect call flow to a different service handler or callback URI, pause or wait before executing more instructions, decline an incoming call, and/or other suitable actions.

An asynchronous communication could be an SMS text message, an MMS message, email, a text or media IP message, a $3^{rd}$ party communication channel message, and/or any suitable type of message. An asynchronous communication may be an individual message but may alternatively be part of a messaging session that may include one or more messages from one or more entities. Similar to synchronous communications, a response of a service handler may include messaging instructions such that augmenting processing of the communication includes executing the messaging instruction for a message communication. A messaging instruction may specify message content (e.g., text, images, video, other types of media), message destination and/or source, messaging delivery options, and/or any suitable properties related to a message communication.

Block S110, which includes configuring a service handler within a computing platform, functions to create an executable function that can be used to respond to requests or implement customized logic. As described above, configuring a service handler may involve creating an application service within the computing platform. The application service preferably provides the scaffolding of a web application such as the router for routing incoming HTTP requests to the proper handler and/or assets. The application service can additionally provide error handling and/or other convenient features of the web application. Within the application service, different service handlers and/or assets can be created and set. In particular, configuring a service handler can additionally include configuring path routes, setting execution code, setting assets, and/or configuring access restrictions.

Configuring path routes can include setting the domain of the service and/or a route path of the service handlers. The domain of the service could be a subdomain of a platform provided domain, or the domain could be a custom domain that is used through DNS. While URI-based addressing schemes can be used. Alternative service handler identification and addressing may be used.

Setting execution code functions to specify the custom logic defining the functionality of the service handler. The execution code is preferably used to define the service handler or function that will be called for an incoming request. Execution code may be set or specified in a variety of approaches. In one variation, setting execution code may include providing an editor in a user interface and receiving user input to the editor. In another variation, service handler resource files and/or execution code could be uploaded as a file and used to define execution code. Execution code may be a single file or could alternatively be organized as a project with various file/resource organizations. In yet another variation, code, assets, a configuration file, and/or other files could be synchronized through pushing a code repository to the computing platform. For example, a git repository could be pushed to a suitable destination of the computing platform to set a service handler.

In yet another variation, execution code could be at least partially set through template code. Template or example code for common usage patterns could be selected by a user and synced with the execution code of a particular service handler. The user could then edit the template code. Accordingly, configuring a service handler can include selecting a service handler template and initializing execution code to be predefined to template execution code. Further configuration of the service handler will generally involve the updating of execution code based on preferences of the account holder. In one variation, a user interface wrapper could provide a user-friendly form used in customizing and updating template code. Alternatively, the template execution code may provide a base template that can be customized in code. In some cases, particular elements of the template execution code may be marked for customization.

As one variation of template service handlers, documentation of the computing platform may use template service handlers to present examples and document use of the platform, while also providing a convenient mechanism for immediately customizing samples for their own applications. In one implementation, the method may include presenting template execution code within documentation, and in association with this documentation, selection of the service handler template can be invoked or selected through activation in the documentation. For example, an account holder may see some documentation of how to build a phone tree in a communication platform, the sample code may be presented in a user interface that has an option to launch as a template so that the account holder can build their own phone tree.

The executable code can be written in any supported language. In one variation, a number of libraries, modules or convenience features could be automatically made available for use. Additional or custom libraries, modules and/or other dependencies could be imported or included when setting the executable code. In one particular implementation, one or more datastores could be embedded with the service handler execution in the runtime environment. While the executable code may be set to perform any suitable function, there could be a number of promoted programming models for integration with the computing platform. The programming models can be standardized approaches that the computing platform will interact with the service handler.

In one programming model, the service handler will be called and passed an event object, context object, and a callback object. The event can contain data about the current invocation including passed HTTP parameters or other data elements. The value of the http parameters can be used to populate attributes of the event object with a value. The context object can provide data about the handler and the executing environment. For example, an account secure identifier, an authentication token, and various user configured key/values could be passed through the context object. In one variation, environment variables can be supplied to the service handler. Environment variables and/or any suitable asset or variable may be encrypted at rest. The callback can be used to complete execution of the handler and return data to the computing platform. In a communication platform, a structured document of communication processing instructions could be passed through the callback by calling the callback function with the structured document as a function variable. Data and/or errors could similarly be passed through the callback function object.

In an alternative programming model, full programmability to the HTTP request and response objects can be exposed. The service handler can be passed a context object, a request object, and a response object. The context object could similarly provide data about the handler and the executing environment. The request and response objects could expose the raw HTTP response and requests. Alternatively, any suitable programming models may be used or supported in a service handler.

As another alternative or additional option, a service handler may be passed a media object and/or a reference to a media object such that a service handler may be configured to directly operate on media used or to be used in a communication.

The process of setting assets functions to set the static files used in the application service. Assets can include any suitable type of file such as image files, audio files, video files, html files, CSS files, data files like a json or CSV file, and/or other suitable types of files. The files could be private or public.

Configuring access restrictions can function to limit access to the service handler and/or the application service as a whole. Preferably, an option exists to restrict access to only communication from the computing platform, and more specifically that access could be limited to activity related to the account holder. In this way, a developer could quickly build a web application to support functionality of a computing platform, but without worrying about securing the web application. An authentication protocol could be enabled. Access restriction options are preferably accompanied by the application of those restrictions during service handler invocation. Block S140 can include authenticating execution request of a service handler based on configured access restrictions. One preferred implementation authenticates an invocation request to a service handler as originating from account activity from the platform. If access is restricted then use of the service handler may be limited to requests made by the platform on behalf of the account. If access is not restricted then use of the service handler may permit any suitable default level of access.

The service handler could be used to perform a wide variety of operations. In the case of a communication platform, some exemplary service handlers could include such as generating call processing instructions as shown in FIG. 10, editing message content as shown in FIG. 11, generate auth tokens for mobile users as shown in FIG. 12, or provide any suitable functionality.

Block S120, which includes setting an association of the service handler and computing platform event, functions to link events of the computing platform with a service handler. Setting this association establishes the event handler flow that is executed when particular events are detected. Various approaches may be used to establish this association such as referencing service handler identifiers when setting an event handler. For example, a dropdown of possible events can be provided in the event handler configuration interface. Configured account service handlers may additionally or alternatively be presented as options within various account configuration dashboards. For example, service handlers may be presented as options when setting the callback URIs for incoming call events for a particular phone number or in other configuration options. Alternatively, the URI of event handlers as configured in block S120 can be used to reference the event handlers in other inputs to the computing platform. For example, a service handler URI may be used in any suitable callback URI. In a communication platform, some exemplary events could include incoming SMS/message, a change in a SMS/message, an incoming voice call, a change in a call status, a call transcription status change, a conference call event, a call queue event, a recording event, and/or other suitable types of events. A service handler may be permanently/semi-permanently associated with platform event. Alternatively, a service handler may be associated with an event condition, with a single instance of an event, or to any suitable scope of events.

As another variation, setting an association of a service handler and an event may additionally be implemented within various application/service customization systems. In one variation, the method may include presenting an application builder user interface wherein within the application builder user interface a service handler can be selected as an event handler option for some component of the application builder user interface. Here an application builder user interface may be any suitable type of application user interface. One preferred example would be a visual workflow edit as shown in FIG. 3, which may be used in specifying various workflows in particular communication-related workflows.

In a similar or related variation, the method may include providing a call center customization framework or an alternative type of user application customization framework. In a call center customization framework, the base components of a call center may be provided with some amount of exposed customization options. Exposing service handler functionality in the call center customization framework may enable the setting of a service handler as an event handler for one or more components of an instance of the call center customization framework.

Block S130, which includes detecting an occurrence of the event, functions to determine when a service handler should be invoked. With the association of a service handler to a platform event, events are preferably triggered when they are encountered in the platform. As one example detecting an event related to phone call may include events for when a call starts, when some event happens during a call, or when a call ends. In one variation, where a service handler is more generally used, the event may include an access request addressed to the service handler URI or other suitable identifier.

Block S140, which includes invoking the service handler in response to the event, functions to process the service handler function. Execution preferably includes executing execution code of the service handler S142, and then optionally generating a service handler response S144. Invoking the service handler may involve relaying a request to the service handler. Other actions like authenticating a request could additionally be implemented when invoking the service handler. Invoking the service handler may involve executing the service handler on a serverless computing architecture either internally or on an external serverless computing platform.

Block S142, which includes executing execution code of a service handler, functions to perform or process the instructions and logic of a configured service handler. Executing execution code preferably includes accessing relayed data and resources and processing them. A service handler response is preferably generated though a service handle may not explicitly generate a response. A response may alternatively not be generated in the event where a service handler performs some action not needing outside action.

Block S150, which includes augmenting the account related state in the computing platform in accordance with the service handler, functions to apply the results within the platform. In a communication platform this may include processing communication-related instructions that can be executed in connection to a particular communication(s). This is generally used in altering the state of a communication session or in determining a proper next step in the asynchronous messaging context. In another variation, media associated with a communication may be processed through a service handler. A service handler may be preferably over other processing options since they could be customized with arbitrary code, and access to a service handler may be more tightly integrated with a platform so that media may not have to be communicated over the public internet. In one variation, invoking the service handler may include relaying a media object of the communication to the service handler. In this situation, generating a service handler response can include applying a transformation on the media object.

The method can additionally include providing execution analytics and/or abnormal behavior detection. With deeper integration into the underlying logic of the service handlers, a computing platform can provide high resolution analytics on internal function calls within a service handler. In a traditional webhook callback model where the application server of a developer is a black box, the computing platform was generally restricted to providing analytics of the webhook URI accessed and the response. The method could report on actual execution of developer specified code as it relates to use of the computing platform. For example, errors could be traced back to particular blocks of code in the service handler. In the error logs of a computing platform, particular lines, metadata, and context can be reported for encountered errors. Additionally, loops and other undesirable states could be better detected through analysis of service handler execution.

More generally, the method may include logging and reporting activity. Logs can be emitted from a service handler in realtime to a console or log, which may facilitate easier debugging. For example, a console could report activity of a service handler as a communication session is taking place. Performance and/or analysis reporting may additionally be integrated into the logging and reporting. For example, a report could be generated showing the execution patterns of a service handler as it handles multiple requests. In additional to logging and reporting, events could be triggered for different events during certain conditions.

The system and method of the preferred embodiment and variations thereof can be embodied and/or implemented at least in part as a machine configured to receive a computer-readable medium storing computer-readable instructions. The instructions are preferably executed by computer-executable components preferably integrated with the media intelligence platform. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
   detecting, by a communication platform, an occurrence of a communication event, the communication event having been previously correlated to invoke a service handler;
   executing a set of execution code associated with the service handler, the set of execution code executed in a serverless execution environment, yielding a service handler response; and
   augmenting a communication facilitated by the communication platform based on the service handler response.

2. The method of claim 1, further comprising:
   receiving the set of execution code; and
   configuring the service handler based on the set of execution code.

3. The method of claim 1, wherein the communication is a synchronous communication session, the service handler response is a synchronous-communication instruction, and
   augmenting the communication comprises executing the synchronous-communication instruction within the communication.

4. The method of claim 3, wherein the synchronous communication session is a voice session.

5. The method of claim 3, wherein the synchronous communication session is a video session.

6. The method of claim 1, wherein the service handler response is a messaging instruction, and augmenting the communication comprises executing the messaging instruction for the communication.

7. The method of claim 1, wherein executing the set of execution code associated with the service handler comprise:
   relaying a media object of the communication to the service handler; and
   applying a transformation to the media object.

8. A communication platform comprising:
   one or more computer processors; and
   one or more computer-readable mediums storing instructions that, when executed by the one or more computer processors, cause the communication platform to perform operations comprising:
   detecting an occurrence of a communication event, the communication event having been previously correlated to invoke a service handler;
   executing a set of execution code associated with the service handler, the set of execution code executed in a serverless execution environment, yielding a service handler response; and augmenting a communication facilitated by the communication platform based on the service handler response.

9. The communication platform of claim 8, the operations further comprising:
receiving the set of execution code; and
configuring the service handler based on the set of execution code.

10. The method of claim 8, wherein the communication is a synchronous communication session, the service handler response is a synchronous-communication instruction, and
augmenting the communication comprises executing the synchronous-communication instruction within the communication.

11. The communication platform of claim 10, wherein the synchronous communication session is a voice session.

12. The communication platform of claim 10, wherein the synchronous communication session is a video session.

13. The communication platform of claim 8, wherein the service handler response is a messaging instruction, and augmenting the communication comprises executing the messaging instruction for the communication.

14. The communication platform of claim 8, wherein executing the set of execution code associated with the service handler comprise:
relaying a media object of the communication to the service handler; and
applying a transformation to the media object.

15. A non-transitory computer-readable medium storing instructions that, when executed by one or more computer processors of a communication platform, cause the communication platform to perform operations comprising:
detecting an occurrence of a communication event, the communication event having been previously correlated to invoke a service handler;
executing a set of execution code associated with the service handler, the set of execution code executed in a serverless execution environment, yielding a service handler response; and
augmenting a communication facilitated by the communication platform based on the service handler response.

16. The non-transitory computer-readable medium of claim 15, the operations further comprising:
receiving the set of execution code; and
configuring the service handler based on the set of execution code.

17. The non-transitory computer-readable medium of claim 15, wherein the communication is a synchronous communication session, the service handler response is a synchronous-communication instruction, and augmenting the communication comprises executing the synchronous-communication instruction within the communication.

18. The non-transitory computer-readable medium of claim 17, wherein the synchronous communication session is a voice session.

19. The non-transitory computer-readable medium of claim 17, wherein the synchronous communication session is a video session.

20. The non-transitory computer-readable medium of claim 15, wherein the service handler response is a messaging instruction, and augmenting the communication comprises executing the messaging instruction for the communication.

* * * * *

UNITED STATES PATENT AND TRADEMARK OFFICE
CERTIFICATE OF CORRECTION

PATENT NO. : 11,150,924 B2
APPLICATION NO. : 16/845074
DATED : October 19, 2021
INVENTOR(S) : Rabasa et al.

Page 1 of 1

It is certified that error appears in the above-identified patent and that said Letters Patent is hereby corrected as shown below:

In the Claims

In Column 17, Line 9, in Claim 10, delete "method" and insert --communication platform-- therefor Signed and Sealed this
Eleventh Day of January, 2022

Drew Hirshfeld
*Performing the Functions and Duties of the*
*Under Secretary of Commerce for Intellectual Property and*
*Director of the United States Patent and Trademark Office*